(12) United States Patent
Smith

(10) Patent No.: US 6,560,623 B1
(45) Date of Patent: May 6, 2003

(54) METHOD AND APPARATUS FOR PRODUCING CORRECTLY ROUNDED VALUES OF FUNCTIONS USING DOUBLE PRECISION OPERANDS

(75) Inventor: Roger Alan Smith, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/397,267

(22) Filed: Sep. 16, 1999

(51) Int. Cl.[7] .................................................. G06F 7/38
(52) U.S. Cl. ........................................ 708/551; 708/497
(58) Field of Search ................................. 708/550–551, 708/496–497, 440, 270

(56) References Cited

U.S. PATENT DOCUMENTS

| | | | | |
|---|---|---|---|---|
| 5,222,036 A | * | 6/1993 | Lindsley | 708/440 |
| 5,600,584 A | * | 2/1997 | Schlafly | 708/551 |
| 5,612,909 A | * | 3/1997 | Morrow | 708/550 |
| 6,134,574 A | * | 10/2000 | Oberman et al. | 708/551 |
| 6,233,672 B1 | * | 5/2001 | Lynch | 708/497 |

* cited by examiner

Primary Examiner—Tan V. Mai

(57) ABSTRACT

A method and apparatus for finding the hard-to-round double precision operands x when processed by a function $f(x)$ and using these hard-to-round numbers to optimize $f(x)$ hardware and software $f(x)$ algorithms to ensure proper rounding begins by segmenting all proper x operands into analysis domains (FIG. 8). The analysis domains are split into sub-domains (1202–1208) where a linear generator is used to generate candidate hard-to-find values for each sub-domain (1210). A quadratic filter is used to reduce the list of candidates to a final list of hard-to-round values for $f(x)$ (1212). The hard-to-round double precision values are used to set a precision of hardware or software $f(x)$ algorithm to ensure proper rounding or all valid x operations while simultaneously ensuring that too much precision, and therefore, reduced performance, is avoided.

10 Claims, 9 Drawing Sheets

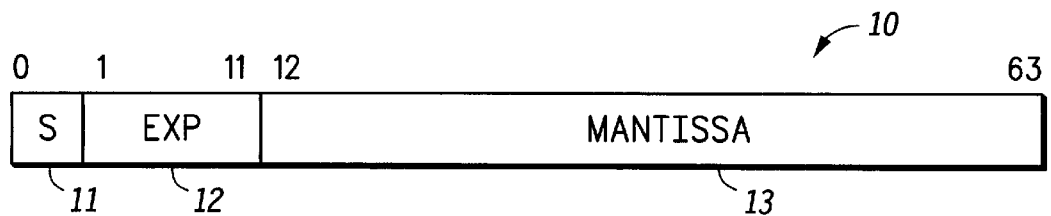
FIG.1
−PRIOR ART−
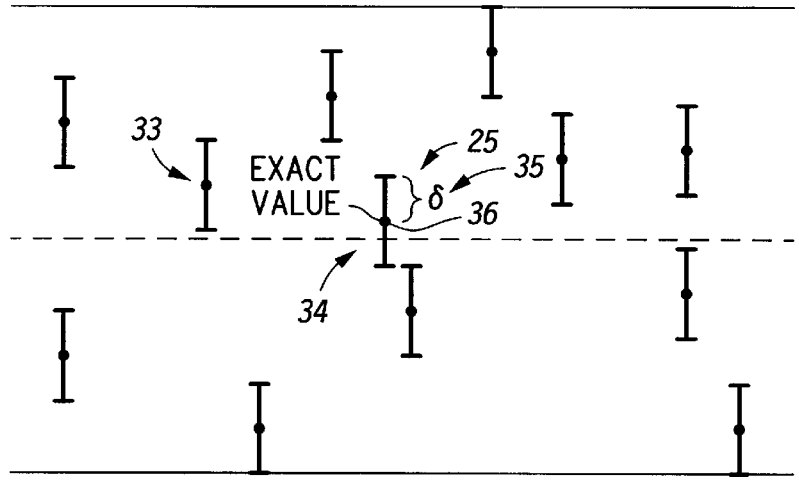
FIG.2
−PRIOR ART−
FIG.3

METHOD AND APPARATUS FOR PRODUCING CORRECTLY ROUNDED VALUES OF FUNCTIONS USING DOUBLE PRECISION OPERANDS

FIELD OF THE INVENTION

The present invention generally relates to performing floating point operations in a floating point unit of a microprocessor, and more specifically to a method for computing correctly rounded function values f(x) of double-precision floating-point numbers within the floating point unit of a microprocessor.

BACKGROUND OF THE INVENTION

Much software is written using numbers which are represented in a floating-point arithmetic format. FIG. 1 illustrates a format 10 for representing real numbers defined by the standard referred to as IEEE 754 (1984). The representation 10 includes a sign bit 11, an 11-bit exponent field 12, and a 52-bit mantissa field 13. Let s, e and n respectively represent the values of the sign, exponent, and mantissa fields where each of these values are treated as unsigned binary numbers. The format 10 represents a number if e is not 2047. If the exponent e is equal to 2047, the format represents an infinity or a Not-a-Number (NaN) as defined by the IEEE standard. If e and n are both 0, the number represented is the value 0. If e is 0 and n is not zero, the number represented is $(-1)^s 2^{-1074}$ n. If e is not zero, the number represented is $(-1)^s 2^{e-1023} (1+2^{-52}n)$.

While many real numbers can be represented using the format 10, many arithmetic operations on two representable numbers can produce a result which is not any of the representable numbers (i.e., the number of bits in the result exceed the number of bits in the double precision format of FIG. 1). For example, the fraction ⅓ cannot be represented to infinite accuracy in the finite number of bits present in the format of FIG. 1. In such cases, a floating-point arithmetic operation usually returns a representable number which differs from the exact result by performing a rounding operation so that the result may be represented in the finite-sized format of FIG. 1. The IEEE 754 (1984) standard allows the use of four rounding modes (round to nearest, round toward zero, round toward plus infinity and round toward minus infinity) and desires that a standard result to be obtained in rounding each possible exact real number to a representable real number for the operations of addition, subtraction, multiplication, division and square root. Most computer processor manufacturers implement the standard for double precision, and as a result, arithmetic results from these operations should be identical across a wide range of software platforms, offering interoperability. In addition, in round-to-nearest mode, the rounding produces the representable number closest to the exact result, maintaining a high degree of accuracy. For the operations of addition, subtraction, multiplication, division and square root, the ability to obtain correctly rounded results offers both portability and accuracy.

There is at present no standard ensuring portability and accuracy for the evaluation of properly rounded transcendental functions of numbers which are represented in double precision format. Nobody has been able to determine for a given function f(x) how accurately an approximate value must be computed so that it is possible to determine how to round it correctly in all double precision cases for that function. There are too many double precision numbers to be able to check each one individually by sequential brute force computation, whereas it is possible to check all single precision arguments by brute force computation to ensure proper rounding in all cases for all f(x). For example, to process all double precision results f(x) in a brute force manner to enable the fixing of the precision of an algorithm to an optimal point that ensure correct rounding with optimal performance for all double precision operands, x, one would need to perform about $2^{63}$ evaluations. Using current computing power, these computations would take 292,000 years per each f(x) implemented by a CPU architecture assuming an optimistic rate of 1 f(x) evaluation per microsecond. Clearly, there is no viable method to brute force process all double precision numbers, using today's technology, for all f(x) for a CPU to ensure algorithm optimization that rounds correctly for all x processed by f(x).

To at least guarantee portability, the Java language requires that certain functions return values computed using certain algorithms that are known to return incorrectly rounded results for a large number of arguments. This requirement virtually requires that a compliant implementation of the function use exactly that algorithm, since there is no other practical way to get the specific wrong values on each of the arguments that returns a wrong value. The problem of determining the set of arguments for which it is necessary to get the wrong value is essentially as hard as the problem of finding how much accuracy is needed in order to ensure proper rounding in all cases.

Interval arithmetic is a form of calculation in which the operands of a function are typically intervals between representable numbers and the result of a function is an interval between representable numbers which is guaranteed to be large enough to contain the exact result if each operand is independently drawn from anywhere inside its interval. A long series of interval arithmetic operations usually results in continually growing intervals, as uncertainties in one result lead to even larger uncertainties in results based on them. The interval sizes grow more rapidly than necessary if functions cannot be rounded correctly, since the resulting interval must be large enough to also include the possibility that rounding was performed incorrectly. Correct rounding is therefore important to interval arithmetic.

Shmuel Gal and Boris Bachelis teach a method which is more likely to return a correctly rounded value than other prior art methods that do not address the rounding problem. FIG. 2 illustrates the fundamental principle taught by Gal and Bachelis. It is well known that all but a few arguments of one of the transcendental functions will have a function value which is not representable exactly in a double precision format. In the Gal and Bachelis method, a function value is computed as the sum of two parts, such that the sum carries more precision than is available in a single double precision number. FIG. 2 illustrates the Gal and Bachelis method for the case of a round-to-nearest mode of operation. Almost all computed function values will lie between a representable number 20 and the next higher representable number 21. The real number 22 (not representable in the format of FIG. 1 since it requires an additional ½ least significant bit (LSB)) lying halfway between the representable numbers 20 and 21 is the critical number for rounding properly in the round-to-nearest mode. If the computed function value f(x) for a value x lies above the line 22, f(x) is rounded to the representable number 21, whereas if the computed f(x) lies below the line, f(x) is rounded to the representable number 20 for the round-to-nearest mode. Each computed function value (e.g., 23 or 24 in FIG. 2) has an error associated with it, and FIG. 2 illustrates a number of error bars for various function values f(x) including the specific values labeled 23 and 24 in FIG. 2. The central value of each error bar is the computed value and the error bars indicate a guaranteed bound on the error of the computation that is a function of the precision of the f(x) computational algorithm used. FIG. 2 does not mean to suggest that all values f(x) lie between the same two representable binary numbers. Rather, FIG. 2 illustrates the superposition of each function value f(x) between the two different representable numbers which surround it.

Gal and Bachelis teach that if the entire error bar lies above or below the line 22, then the rounding operation described above is guaranteed to be correct. As an example, the error bar specifically labeled as bar 23 in FIG. 2, will give the correctly rounded function value 21 since the error bar 23 does not overlie or cross over the midpoint 22. However, the error bar 24, which crosses the line 22 in FIG. 2 might give an incorrectly rounded function, since if the exact value were truly below the line 22 yet still within the error bar, the result would be incorrectly rounded up since the computed value is above the line 22 in FIG. 2 (opposite to the true location of the exact value). In essence, the presence of the computation close to the midpoint or rounding point 22 coupled with a finite range of possible error in the precision of the computation could result in improper rounding. Therefore, if the error bar is detected to be crossing the critical rounding line 22, a more accurate computation algorithm must be used in order to attempt to get accurate rounding. Gal and Bachelis describe computing a more accurate approximation in the case where the error bar likely crosses the rounding point 22 which is likely, but not guaranteed, to give a correctly rounded answer.

While Gal and Bachelis can reduce the probability of getting an incorrectly rounded f(x), it is never known in advance how many bits of precision will ultimately be needed to get the correctly rounded value of f(x) for all x within the entire double precision range(e.g., Gal and Bachelis cannot determine for each f(x) whether 10, 100, 1000 or more bits of precision are truly needed in order to resolve the incorrect rounding problem for each f(x)). The probability of an incorrect result is decreased by Gal and Bachelis by arbitrarily adding some number of extra bits of precision which may or may not actually fix the incorrect rounding problem. The probability of an incorrect result rounding is decreased by roughly a factor of ½ for each additional bit of precision added to the algorithm. Thus reducing the probability of incorrect rounding by a factor of 1 billion would require approximately 30 extra bits of precision. There are two difficulties which result from the arbitrary precision extension approach of Gal and Bachelis.

First, the Gal and Bachelis method usually requires many additional bits beyond those actually needed to ensure correct rounding. In other words, Gal and Bachelis may predict that a rounding operation is too close to the rounding point for current precision and increase the algorithm's precision by 5x where a simple increase in precision of a few bits would have sufficed to solve the rounding problem. This overcompensation of precision is needed just to reduce the probability that they guessed wrong how many bits were actually needed for the second, more accurate computation. Therefore, when Gal and Bachelis do result in correct rounding, they may have wasted significant computing power in overkill operations in order to get to that result.

Second, even after adding many additional bits to the precision of the algorithm, there is a remaining probability that not enough bits were added whereby incorrect rounding results in spite of their efforts to avoid such an outcome. Such incorrect rounding would occur even though Gal and Bachelis expended significant resources in an attempt to avoid that outcome. The first difficulty discussed above means that either a hardware or software implementation will likely be more expensive than it needs to be to obtain proper rounding, while the second difficulty discussed above means that their "solution" may not be sufficient to get the correct result for all arguments x in the double precision range. In effect, the Gal and Bachelis solution is guesswork and not guaranteed to produce correct rounding with the minimal possible overhead.

Similar arguments can be made for the Gal and Bachelis solution when they are using the other rounding modes (e.g., round to plus infinity, round to zero, etc). Or different rounding modes, the only difference is that the rounding line would then be at a representable number, like 20 or 21, instead of the midway ½ LSB point 22.

Therefore, prior art is likely to do too much work and still have a chance of getting the wrong answer, whereby a need exists in the industry for a method that guarantees that each floating point result f(x) for all x in a double precision range will always round properly without undue overhead or overcompensation.

BRIEF DESCRIPTION OF THE DRAWINGS

FIG. 1 illustrates, in a block diagram, an IEEE 754 (1984) floating point number format used in the prior art.

FIG. 2 illustrates, in a graph, computed floating point f(x) values and their error ranges for prior art floating point computations.

FIG. 3 illustrates, in a graph, exact floating point f(x) values and their approximation evaluator error ranges in accordance with the present invention.

DETAILED DESCRIPTION

Figure 4:
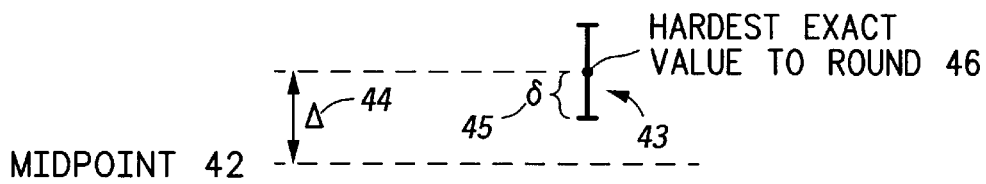
FIG. 4 illustrates, in a magnified view of a portion of FIG. 3, the worst case hardest-to-round x value for a given function f(x) in accordance with the present invention.

The present embodiment discussed herein teaches: (1) a method for using hard-to-round sets of numbers f(x) to define an optimal precision of a computation algorithm such that correct rounding is ensured for all x while performance is optimized as well; (2) an efficient method and apparatus for determination of the set of double-precision arguments x of a function f(x), such that f(x) needs to be computed to extremely high precision in order to ensure correct rounding, (3) an efficient method and apparatus for constructing a hardware or software evaluator which for all arguments x produces correctly rounded function values f(x), and (4) an efficient method and apparatus for finding all values of integers which satisfy a certain set of linear constraints.

For a given function f(x), x will be called hard-to-round values if f(x) and not the x value itself is hard to properly round (e.g., it is very close to a rounding point similar to the rounding point 32 shown in FIG. 3). The power of the method taught herein is illustrated, in one example, by looking at the hardest-to-round value x for the function $\log_2(x)$. The hardest-to-round value of x or $f(x)=\log_2(x)$ (found by the algorithms taught herein) is as follows, with the fraction being in hexadecimal notation and the exponent being in decimal notation:

$x=2^{2048}$ 1.61555F75885B4 and its function value f(x) where $f(x)=\log_2(x)$ is approximately $\log_2(x)=2^{11}$ 1.000EE05A07A6E7FFFFFFFFFFFFCE9.

It is easy to see why the value f(x) above is difficult to round due to its long string of "pH" bits near the bit position point where rounding is to occur. There are two choices to round the number to a representable double precision number 20 or 21 as indicated in FIG. 2. These two choices are:

$2^{11}$ 1.000EE05A07A6E and $2^{11}$ 1.000EE05A07A6F.

As may be seen from the value f(x) above, an error in rounding to the nearest number 20 or 21 could occur if the function value f(x) were miscomputed by as little as (hexadecimal fraction, decimal exponent)

$2^{11}$ 0.00000000000000000000000000000032, while if the function value were computed with a maximum error (hexadecimal fraction, decimal exponent) of $2^{11}$ 0.00000000000000000000000000000030, f(x) would be properly rounded. Therefore, as previously stated, this rounding difficulty for this f(x) value results due to the long string of binary ones (i.e., the sequence "7FFFFFFFFFFFFCE9") found at the least-significant end of its f(x) value around the rounding point. Therefore, $x=2^{2048}$ 1.61555F75885B4 is a hard-to-round value for the function $f(x)=\log_2(x)$.

The methodology taught herein determines the above hard-to-round value along with other hard-to-round values for $\log_2(x)$ and other functions (e.g., sin h(x), exp(x), arctan (x), log(x)etc.) without taking 292,000 years per function. Once these hard-to-round values x are efficiently determined, the methodology then determines a requisite precision needed for that function given the hard-to-round x so that all values of $\log_2(x)$ are computed with enough significant bits to properly round the hard-to-round values. Once all hard-to-round values are ensured to round properly with minimal computational power then all values of $\log_2(x)$ will be properly rounded for all x in the double precision range in all cases. Nobody has been able to make this claim with certainty to date.

To achieve the above unexpected results, the present invention approaches the problem from a very different angle than the prior art method of Gal and Bachelis or the brute force method described herein. The present approach is to determine in advance, once and for all, what arguments are hardest-to-round or a particular function f(x). Once this has been performed for a function f(x), it is then possible to design hardware, software, and other solutions which are guaranteed to achieve the necessary accuracy, yet which use no unnecessary extra precision to obtain a 100% proper rounding outcome for all x.

If it were possible to evaluate the difficulty of rounding for all double precision arguments via a brute force approach, as can be done for single precision functions, this achievement would be straightforward. However, to evaluate a function f(x) for 263 arguments x at the rate of 1,000,000 per second and find the hardest of the function values to round would require a time of about 292,000 years using existing processing power. The present invention permits this apparently impossible task to be performed for a given double precision function f(x) at a speedup of about 100,000 for a single machine. Furthermore, the method and apparatus taught herein can be easily parallel processed, and can therefore be quickened by orders of magnitude by performing parallel computations on multiple machines thereby further increasing the time savings per f(x) analyzed.

The methodology focuses on exact function values in FIG. 3 instead of computed function values as in FIG. 2. FIG. 3 shows the case for the rounding-to-nearest mode, however, any one of the four rounding techniques outlined in IEEE 754 may be processed similarly. Line 30 represents a representable number in the IEEE 754 double precision format, line 31 represents the next higher representable number in that format, and line 32 represents the exact but unrepresentable number halfway between the representable numbers 30 and 31. The error bars, including error bars 33 and 34, in FIG. 3, represent bounds on the specific values f(x) which could be computed. The center of each error bar represents an exact function f(x) value 36, while the error bars represent the outside values a distance δ 35 away from the exact function value within which a computed function could lie if the error of the approximation were less than δ 35. For different approximation techniques that are used herein, there will be different values of δ 35. FIG. 3 does not mean to suggest that all values f(x) lie between the same two representable numbers. Rather, FIG. 3 illustrates the superposition of each function value f(x) between the two representable numbers which surround it. If a set of error bars, like error bar 33, lies entirely above or below the line 32, the computed function value f(x) will correctly be rounded.

If an error bar, like error bar 34, straddles the line 32 in FIG. 3, the computed value might or might not be correctly rounded given the potential for error of up to approximately δ 35. While FIG. 3 is superficially similar to FIG. 2, FIG. 3 emphasizes the exact function value, which has a definite value independent of any error whereas a computed value of FIG. 2 would depend on how the function was computed. The independence makes it possible to do the determination taught herein one time for each function f(x) implemented by the CPU.

FIG. 4 illustrates, for some set of arguments x of the function f(x), the error bar 43 for that x whose center point f(x) 46 lies closest to its rounding line or midpoint 42. In other words, for that set of arguments x, all other function values f(x) lie farther away from their respective rounding lines 42 than this one "worst-case" value in FIG. 4. For sets of double precision numbers x of interest, the scale of FIG. 4 is such that the nearest representable numbers for the value 46 would not only be far off the page, but far off the earth (i.e., the scale of FIG. 4 is incredibly small and is a very magnified view of a very small section of FIG. 3 close to line 32/42. The value Δ44 in FIG. 4 represents the distance that this hardest-to-round point 46 is away from the rounding line 42 for the round-to-nearest IEEE mode. The idea underlying the methodology is that if an approximation for the function f(x) is chosen for that set of hardest-to-round x such that the error in this approximation is no more than δ 45, the function will be correctly rounded for all x in the set as long as δ<Δ. The hard part of the computation is determining the worst case value of Δ for a given set of up to $2^{64}$ x operand values to ensure proper rounding for all x when processed to obtain f(x). However, this analysis to find Δ only needs to be done once for a given f(x) set, and after this analysis is done once, all double precision floating point designs may reuse this Δ information, without recalculating it, to ensure the design will properly round double precision f(x) values for a chosen f(x) approximation technique.

Figure 5:
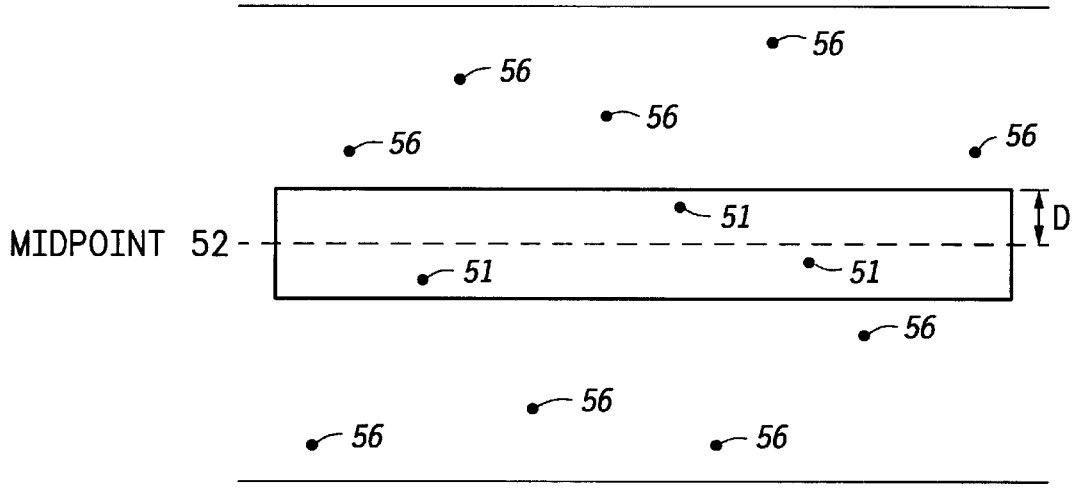
FIG. 5 illustrates, in a graph, a window approach to finding a set of hard-to-round values x that result in hard-to-round values of f(x) in accordance with the present invention.

FIG. 5 illustrates a more versatile and robust approach that allows further algorithm optimization than simply finding the single one hardest-to-round x value as in FIG. 4. For each x in a domain of arguments x of the function f(x), the line 52 represents the rounding point for its f(x) for the round-to-nearest mode. A range of size D 55 is predetermined, and a set of all points x such that the exact f(x) lies within a distance D from its rounding line 52 are identified. Thus, the x values which result in the f(x) values 51 in FIG. 5 are in the set, while the x values which result in the f(x) values 56 are not in the set of hard-to-round values. The values 56 are not in the set since they lie farther away from the rounding line 52 than the distance D. The case illustrated in FIG. 4 would correspond to the case where D was chosen to include a small number of x values. Those x which are found within a distance D from point 52 are the hard-to-round x values that form the hard-to-round set. In practice, the size of D is typically estimated so that for each x value found within the distance D from the rounding line 52, about 140,000,000,000,000 other values of x are more than the distance D from the rounding line 52. Therefore, the D value is typically a very small value that defines a very thin window around the point 52 for reasons discussed below.

For each fixed exponent value e 12 (see FIG. 1) of a double precision number, about 30 values of x are kept when D is properly chosen. The advantage of keeping more than one value of x as the hardest-to-round values is that one might be lucky, where the actual error for a particular approximation to the hardest-to-round f(x) would be less than δ whereby the worst case in FIG. 4 would turn out to accidentally round correctly for a given approximation while another value of f(x) may be farther from the rounding point 42 and yet be improperly rounded. In other words, some farther removed f(x) values from the midpoint 42 may round improperly even though the most-worst-case value of x did round properly. In summary, the window approach of FIG. 5 is attractive since the x value that creates an f(x) value closest to the line 52 may not always be the hardest value to round. Sometimes, a point slightly farther from the line 52 than the hardest-to-round point is the most problematic value for proper rounding due to the differences in the ranges δ 35. Due to the above phenomenon, other values of x in the set defined by D should be considered when other harder-to-round values of x in the set round properly. Keeping a set of x values instead of just one worst case x value ensures that this "luck" anomaly does not result in adverse rounding consequences in the final implemented CPU or software computational algorithms.

Figure 6:
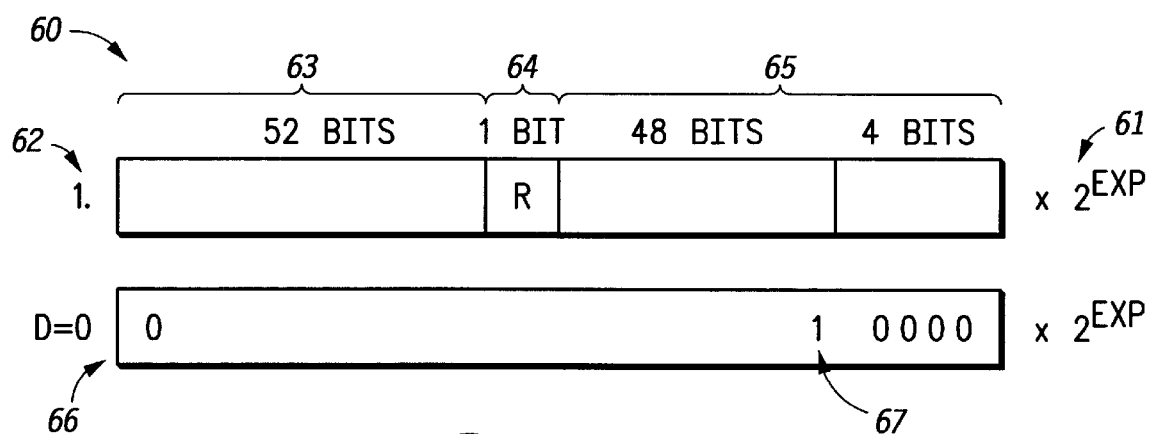
FIG. 6 illustrates, in a block diagram, a graphical representation of a value of D that is used to define the window in FIG. 5 in accordance with the present invention.

FIG. 6 illustrates the leading 106 bits of an exact function value f(x) 60 having an exponent 61, one implicit representable bit 62 (generally referred to as a "hidden bit"), 52 explicit representable bits 63, one rounding bit 64 and 52 guard bits 65. FIG. 6 also shows a suitable value of D 66, which has a binary 1 only in the bit position 67 indicated where D is a very small number as previously discussed. The smallness of D is relative to the size of f(x).

Figure 7:
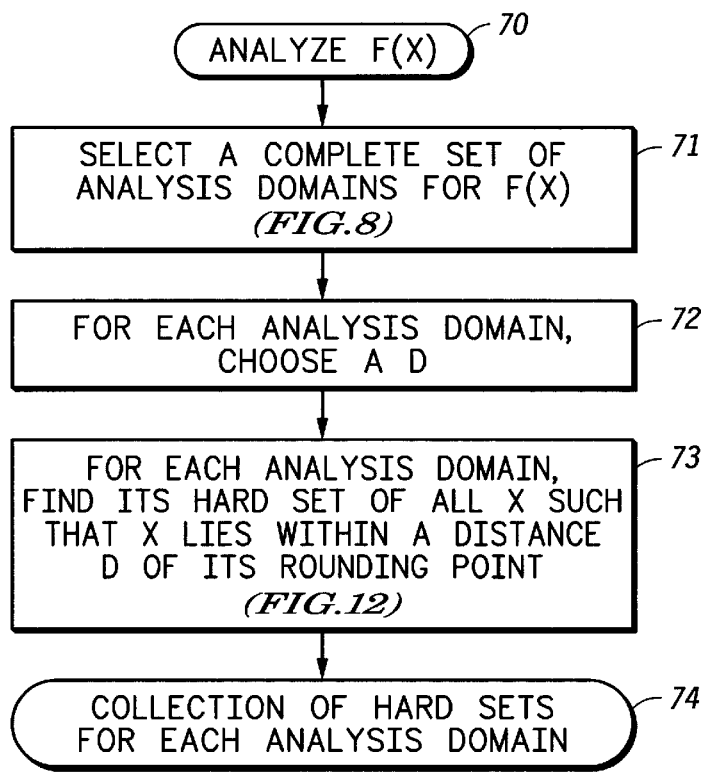
FIG. 7 illustrates, in a flowchart, a method for finding the hardest-to-round values x in accordance with the present invention.
Figure 8:
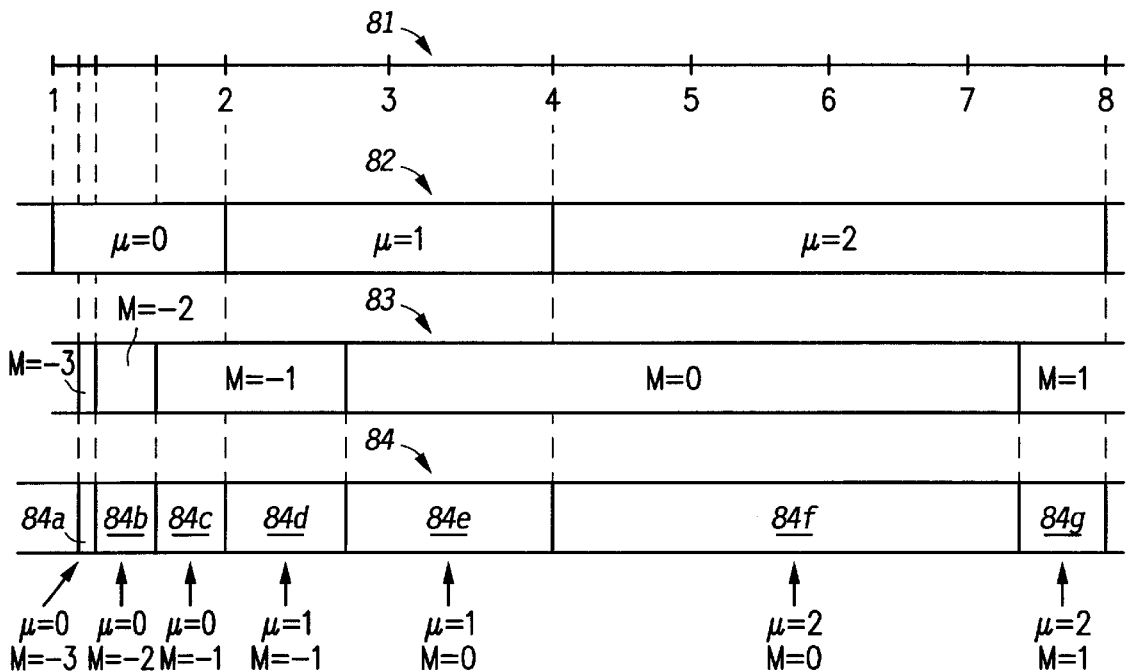
FIG. 8 illustrates, in a number line diagram, the analysis domains which are used to find the hardest-to-round values x in FIG. 7 and in accordance with the present invention.
Figure 9:
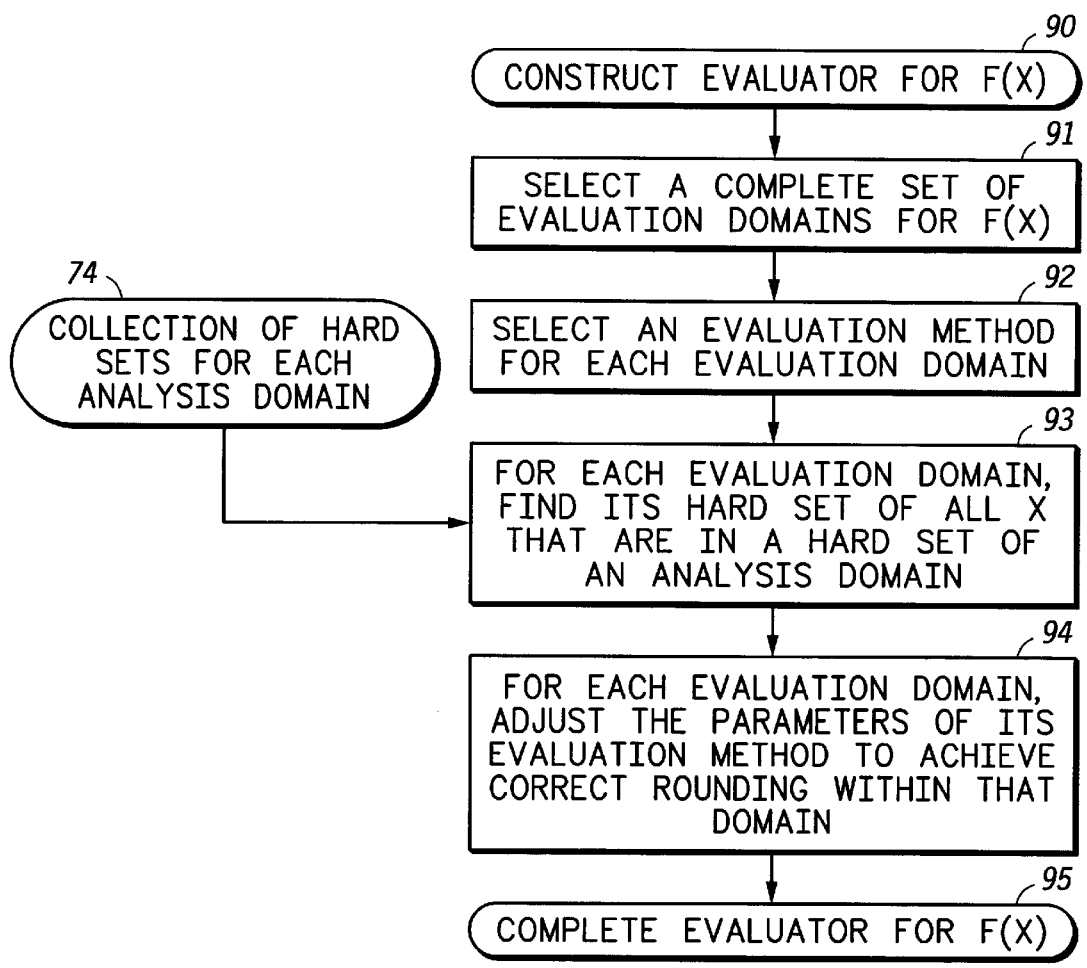
FIG. 9 illustrates, in a flowchart, a method for using the hard-to-round set of x values to optimize an evaluation routine for f(x) to ensure proper rounding for all x in accordance with the present invention.

FIGS. 7–9 together present a high-level description of a method for constructing evaluators for a double precision function f(x) of double precision arguments x which will give correctly rounded function values for all arguments x. FIG. 7 shows an analysis method which can be performed once for each function f(x) whereby after such performance is complete, many different floating point unit (FPU) or software designs may reuse the same information gathered from FIG. 7 so that these different designs can be created to properly round double precision function values for the various functions f(x). The entry step 70 of FIG. 7 starts analysis for a particular function f(x). In step 71, the entire domain of f(x) which is representable as double precision numbers is broken up into a number of analysis domains (as shown in FIG. 8). As an example, consider the function f(x)=ln(x). First, special double-precision values are removed from consideration. If x is a Not-a-Number (NaN), −infinity, a negative number, or zero, then x is not in the domain of ln(x). An evaluator can recognize these x values easily and perform a standard exception action so that these "special x values" are removed from domain processing in step 71 of FIG. 7. The case x=1 is known to be the only finite representable argument for which ln(x) is exactly representable and the case x=∞ is the only infinite argument for which ln(x) is exactly representable, and again an evaluator can recognize these cases easily and perform an action leading to the exact result. All remaining x values are numeric and represent positive numbers. Similar analysis can be performed for all of the standard transcendental functions other than ln(x) so that domain formation is optimized to improve the time it takes to determine the set of hard-to-round x values for any function f(x).

Out of these remaining x values, more x values may be removed from the analysis. One case which often arises involves large sets of consecutive representable arguments x for which f(x) is too large to be representable (i.e., overflow). These values of x that result in overflow or underflow may be excluded from the analysis domains since a small number of simple tests can be used to obtain the correctly rounded results. Another case which often arises involves large sets of consecutive representable arguments x for which a correctly rounded f(x) is easy to obtain even though f(x) is close to a rounding line. For example, the function $\tan^{-1}(x)$ for small x is known to be slightly less than x, and for sufficiently small positive x, it is easy to determine the correctly rounded value whereby these values need not be analyzed in domains via the steps 72–74 of FIG. 7. These cases are always straightforward to recognize in both the analysis process of FIG. 7 and also in the construction of an evaluator in FIG. 9. It is useful to augment the remaining values of x by an additional set which would represent representable values biased by an additional power of $2^{1536}$ or $2^{-1536}$, since additional biases of these magnitudes can be associated with floating-point overflow or underflow of numbers represented in IEEE 754 (1984) format. The final result is a set of x values that should be analyzed within a plurality of analysis domains in order to find the set of hard-to-round x values for a specific f(x).

Finally, a set of analysis domains are chosen in step 71 as shown in FIG. 8. The analysis domains are characterized by values of $\mu$, m, s and s', such that each x is in a domain ($\mu$, m, s, s') if all of:

$$2^{\mu} \leq |x| < 2^{\mu+1} \quad (1)$$

$$2^{m} \leq |f(x)| < 2^{m+1} \quad (2)$$

x has the sign of $(-1)^s$ \quad (3)

f(x) has the sign of $(-1)^{s'}$ \quad (4)

The structure of these domains of x values makes them easy to use for the analysis, since all x in a domain have the same sign and alignment of bits (due to $\mu$) and the range of f(x) has a common sign and alignment of bits (due to m). A double-precision x in a particular analysis domain (see FIG. 8) may be represented by integers s, $\mu$ and n as $$x = (-1)^s 2^{\mu} (1 + n\, 2^{-52}), \quad (5)$$

where $0 \leq n_1 \leq n \leq n_2 < 2^{52}$. The $n_1$ and $n_2$ are chosen so that m and s' remain constant over the domain. The representation of the domain by $n_1$ and $n_2$ is useful because these numbers $n_1$ and $n_2$ are associated with the argument of the function, x, rather than with the function value f(x).

FIG. 8 specifically illustrates some of the analysis domains appropriate for the function f(x)=ln(x) as are generated by step 71 of FIG. 7. In FIG. 8, a portion 81 of the real number line includes the numbers 1 through 8. The bar graph 82 illustrates regions corresponding to different values of $\mu$ as set forth in the above equations (1)–(5). For example, the region between 1 and 2 on line 81 corresponds to $\mu$=0 and the region between 2 and 4 on line 81 corresponds to $\mu$=1 as shown in FIG. 8. The bar graph 83 illustrates regions corresponding to different values of m as used in the above equations (1)–(5). For example, the region between $\sqrt{e}$ and e on line 81 corresponds to m=−1 since for x in that domain, ln(x) lies between $2^{-1}$=½ and $2^0$=1. Similarly, the region between 1 and e on line 81 corresponds to m=0. The bar graph 84 illustrates the analysis domains corresponding to specific values of $\mu$ and m. In FIG. 8, seven analysis domains 84a–84g are shown where each analysis domain 84a–84g may contain up to $2^{52}$ x numbers. For the case of the real-valued logarithm function, the value s is always 0. For numbers x greater than 1, the value s' is 0. The case of numbers x less than 1 looks similar, but has not been illustrated herein. A large class of useful functions f(x) (e.g., sin h, cos h, tan h, sin h$^{-1}$, cos h$^{-1}$, tan h$^{-1}$, $\log_b$, arc tan, $b^x$, etc.) can be identified, filtered by x value, and domain-parsed as generally set forth above and shown in FIG. 8. The parameter b denotes an arbitrary base, of which common values are 2, e, and 10.

For typical f(x), the construction of the domain sets in step 71 of FIG. 7 (see also FIG. 8) can be achieved in many ways. A satisfactory manner of construction is to start with the negative x value largest in magnitude and work through to the largest positive x value, taking incremental steps which are the minimum of the four results: (1) next x to change $\mu$, (2) next x to change s, (3) next x to change m, (4) next x to change m'. A change for one of the above criterions (1)–(4) indicates an analysis domain boundary. For each function, it is obvious to exclude certain values, such as negative arguments for the real-valued ln(x), from the domain analysis to speed processing of the domains.

Returning to step 72 of FIG. 7, a D value is then chosen for each domain defined by step 71. The choice of the value of D was set forth with respect to FIG. 6 above. Specifically, a good choice or D is D=$2^{m-101}$ where m is the m value for each domain, but other values of D would be equally useful. Changing D would only change the multiplicity of values captured as the "hardest-to-round" set. Some applications or function f(x) may need more working values in the window D than others. The complex work of processing the domains in serial or in parallel to find a set of hardest-to-round x is done in a step 73 of FIG. 7. Step 73 will be described in much greater detail via FIG. 12 below. Step 73 determines for each analysis domain, a hard-to-round set of all x such that f(x) is within a distance D of its rounding point (see FIGS. 5–6 for a discussion of the window D). In other words, step 73 (FIG. 12) finds the hard-to-round values of x as previously discussed for FIGS. 3–6. Finally, the result or output of steps 71–73 is a collection 74 of the hard-to-round sets of x for each analysis domain for a given function f(x). Collectively, these are the arguments x for which an approximation of f(x) must be computed most accurately before f(x) can be guaranteed to be rounded correctly for all x processed by f(x).

FIG. 9 illustrates a method for constructing a function evaluator for a function f(x), which begins in step 90 with identification of the function f(x). An evaluator is a method or set of methods for producing a correctly rounded function result f(x) given x. Typically, an evaluator will apply different methods to function arguments x lying in different domains to ensure optimal performance. These domains will be called evaluation domains. Generally, the evaluation domains are fewer in number and different from the analysis domains of FIGS. 7–8, however, the two could be identical in some circumstances. In step 91, a complete set of evaluation domains is chosen, and in step 92 a general method for evaluating the function f(x) in each evaluation domain is chosen. For the function ln(x), for example, one possible choice would be to use one polynomial for processing x near 1 and another method for other numeric values of x such that x=$2^{\mu}$(1+y). For example, for x=$2^{\mu}$(1+y), it is possible to evaluate ln($2^{\mu}$(1+y)) as $\mu$ ln(2)+ln(1+y), in one of multiple ways, such as an adaptation of the method taught in U.S. Pat. No. 5,546,333 which is incorporated by reference herein.

Another choice might be to perform a CORDIC operation to obtain a result f(x) for the values of x. For a given function f(x), one or more sets of evaluation domains might be domains where the correctly rounded value could be determined directly, as discussed in the description of FIG. 7 above. In contrast to the complex task of finding the collection 74 of hard sets in FIG. 7, it is a simple task to find the collection of x that are hard to round in each evaluation domain in step 93. It is only necessary to go through each x in a hard-to-round set 74 and to assign it to the evaluation domain containing that x for evaluation.

Finally, in step 94, the parameters of the evaluation method for that evaluation domain may be adjusted so that the maximum error of the evaluation method for that evaluation domain is: (1) less than the D for any analysis domain included in that domain; and (2) small enough so that f(x) will be correctly rounded for each x in that domain. The first of these conditions guarantees that all x not explicitly considered will round correctly, while the second condition keeps the evaluation method from evaluating approximate function values more than is necessary to ensure proper rounding (i.e., condition (2) reduces computational overhead in a deterministic and definite manner unlike the Gal and Bachelis algorithm set forth in the Background herein). Typical ways of reducing the maximum error of an evaluation method include increasing the order of a polynomial and the precision of the polynomial computation and increasing the number of iterations and the number of bits needed in each term in a CORDIC operation. Note that an evaluation method may include conditional steps, such as stopping a CORDIC rotation when it can be determined that a current approximate result, when rounded, will give a correctly rounded result, or conditionally evaluating additional terms in a polynomial, corrections to a polynomial, or a different polynomial based on an initial computation. A complete evaluator for f(x) in step 95 can be constructed by first performing comparisons on the argument x to determine which domain it is in and then in performing the evaluation method for that domain. In certain execution environments, some evaluation and conditional control flow can be performed in parallel. The complete evaluator f(x) 95 is an evaluator that will produce properly rounded f(x) values for all x with minimal/optimal computational resources being committed.

Figure 10:
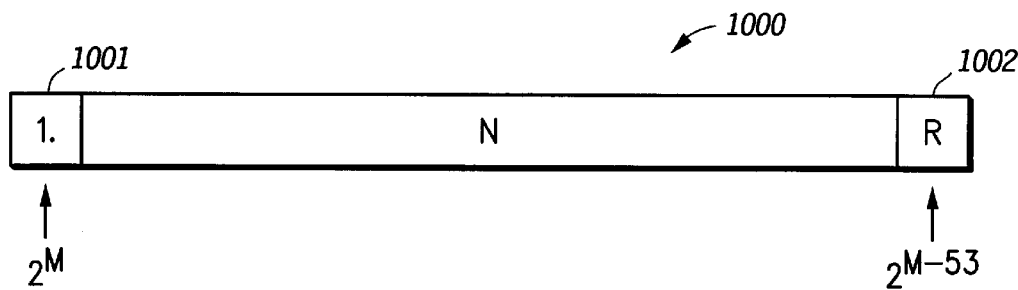
FIG. 10 illustrates, in a block diagram, the concept of a rounding bit in accordance with the present invention.

FIGS. 7–9 explain the overall high level process of how to: (1) find hardest-to-round numbers for a function f(x); and (2) use those numbers develop f(x) evaluation algorithms in one or more operand-defined analysis domains in software, hardware, firmware or other solutions where properly rounded numbers f(x) are output with a consumption of an optimally low number of MIPS. However, it is best to focus on some of the details occurring in the process of FIG. 7 in order to deepen understanding of the high level method taught above. Step 73 of FIG. 7 is the most difficult task performed in the process of FIG. 7. Before describing that step 73 in greater detail in FIG. 12, it is useful to present some mathematical motivation for the method used to complete the complex task of step 73. The goal of step 73 is to find a set of x such that f(x) is relatively hard-to-round as defined via FIGS. 5–6. FIG. 10 illustrates the high-order 54 bits 1000 of an exact non-zero f(x) result associated with an analysis domain ($\mu$, m, s, s'). The leading bit 1001 corresponds to the bit position $2^m$. The rounding bit R 1002 corresponds to the bit position $2^{m-53}$. The value f(x) is hard to round if the exact value of f(x) is very close to a number exactly representable in the 54 bits of FIG. 10.

Figure 11:
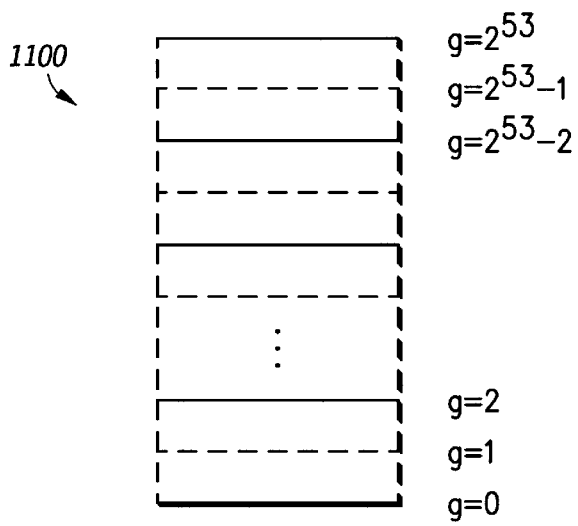
FIG. 11 illustrates, in a block diagram, a set of evaluation small intervals used by FIG. 12 to analyze a larger interval of floating point values to find the hard-to-round set of x in accordance with the present invention.

For given values of m and s, there are $2^{53}+1$ exactly representable numbers and halfway-between (not-representable) numbers which f(x) could round to. These critical numbers can be labeled by an integer g which can take on the values from 0 through $2^{53}$ inclusive as $2^{m-53}$ g. FIG. 11 shows a representation 1100 of these representable numbers. The hard-to-round values are those for which:

$$\min |f(x)-2^{m-53}g| \leq D=2^{m-101}, \quad (6)$$

where the minimum is over all g values. As stated earlier, the specific choice of D is generally some small number but is somewhat flexible. Larger values of D are likely to generate larger sets of hard-to-round function value arguments x without being much more useful in determining function f(x) evaluators in FIG. 9, while smaller values of D run a small risk of generating empty sets or too small of sets, thus placing an upper bound on the difficulty of rounding a number without finding a worst case.

The task of finding the hard-to-round values of x can be stated then as finding the set of values n (see equation (5) above), such that:

$$\min |f(x)-g\ 2^{m-53}| \leq D \quad (7)$$

$$n_1 \leq n \leq n_2 \quad (8)$$

Figure 12:
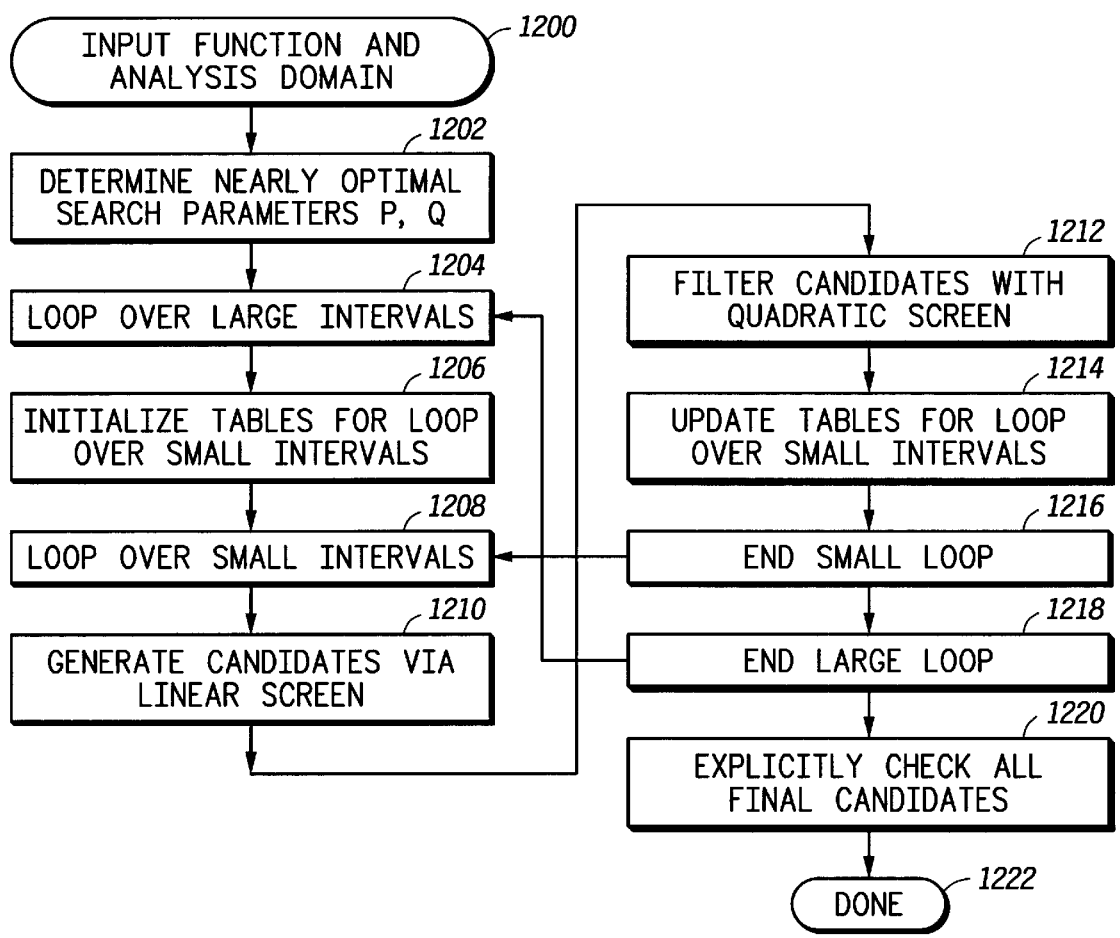
FIG. 12 illustrates, in a flowchart, a method for finding the hard-to-round x values for use in the process of FIGS. 7 and 9 in accordance with the present invention.

Equation (8) ensures that x is in the current analysis domain. FIG. 12 shows a method for finding the set of hard-to-round values x by a method which is very much different and very much faster than evaluating the minimum absolute value for each x in the interval (i.e., a very time-consuming brute force method). FIG. 12 starts in a step 1200 with a function f(x) and an analysis domain characterized by ($\mu$,m,$n_1$,$n_2$). The possible very large ($2^{52}$) interval between $n_1$ and $n_2$ is broken into many smaller intervals of size $2^{p+1}$, where p is a parameter to be determined optimally for each analysis domain. Over a small interval ($x_1$, $x_2$), it is possible to expand the function f(x) (exactly) in a Taylor series:

$$f(x)=f(x_0)+f'(x_0)(x-x_0)+f''(x_0)(x-x_0)^2/2+f'''(\zeta)(x-x_0)^3/6, \quad (9)$$

where $\zeta$ is an (unknown) point in the interval ($x_1$, $x_2$). Expressing the x's in terms of the corresponding n's (see eqn. (5) hereinabove) and letting d=(n–$n_0$), the result may be expressed, noting that $x-x_0=2^{\mu-52}(n-n_0)$, as $$f(x)=v+v'd+v''d^2+v'''d^3, \quad (10)$$

$$v=f(x_0) \quad (11)$$

$$v'2^{\mu-52}f'(x_0) \quad (12)$$

$$v''=2^{2\mu-105}f''(x_0) \quad (13)$$

$$v'''2^{3\mu-156}f'''(\zeta)/6. \quad (14)$$

Using these variables from eqns. (10)–(14), a value of x is in the hard-to-round set given by equations (7) and (10) if $$\min |v+v'd+v''d^2+v'''d^3-g\ 2^{m-53}| \leq D. \quad (15)$$

for some $0 \leq g \leq 2^{53}$

While eqn. (15) might appear to require a knowledge of the unknown value of $\zeta$, which is different for each x, the method used herein does not require the value of $\zeta$ for any x. Instead, the method utilizes a bound based on the largest value that the term v''' could take on. An upper bound is easy to construct and independent of x.

A key observation to make is that a value in the hard-to-round set is also in the sets defined by:

$$S_2=\{x: \min |v+v'd+v''d^2-g\ 2^{m-53}| \leq D+\max|v'''d^3|\} \quad (16)$$

and $$S_1=\{x: \min |v+v'd-g\ 2^{m-53}| \leq D+\max|v''d^2|+\max|v'''d^3|\} \quad (17)$$

Where the max |w| indicates an upper bound on the absolute value of w over the domain. In general, there will be not-hard-to-round x values in both the sets $S_1$ and $S_2$. What is important is that all hard-to-round values x will also be in these sets. In other words, the sets S1 and S2 are overinclusive, but are guaranteed to capture all the hard-to-round x values. The inequality in equation (17) defining $S_1$ is used in the method as a generator of candidate values for the hard-to-round set of x values. It very rapidly generates values x which include all hard-to-round arguments x but many times more that number of not-hard-to-round arguments x. The inequality in equation (16), which defines set $S_{2-}$, is used in the method to quadratically filter candidates from the linearly-generated set $S_1$ to create the smaller set $S_{2-}$. It even more rapidly eliminates most of the not-hard-to-round values x generated by the linear generator, resulting in the set $S_2$. There are typically few enough x left in the set $S_2$ that each element can be easily checked in order and exhaustively in order to see if it is in the interesting hard-to-round set of x or not.

Some of the uniqueness of the method described in FIG. 12 comes from its: (1) division of the analysis domain into small intervals, including the choice of the size of those intervals; (2) use of a linear generator on each small interval to generate $S_1$; (3) use of a quadratic filter on each x generated by the linear generator to generate $S_{2-}$; and (4) method used in the fast linear generator. With these mathematical preliminaries in mind, the actions described in FIG. 12 can be described in specific detail below.

In step 1202, optimal interval size parameters p and q are chosen. The parameter p limits a small interval size to $$|d| \leq 2^p \tag{18}$$

while the parameter q determines the number $2_q$ of small intervals within a large interval. Good values of the parameter p are critical to performing the computation in a reasonable time. Small values of p tend to generate fewer not-hard-to-round x but take a lot of time, while large values of p tend to generate too many not-hard-to-round x. A good estimate of the cost per x-value in an analysis domain is:

$$\cos t = A\ (p+1)2^{-(p+1)} + 2^{-b} \tag{19}$$

where A is a parameter describing the cost of a linear generator which generates candidates from $2^{p+1}$ numbers in time proportional to (p+1) relative to the cost of screening a candidate, and b is an estimate of the expected number of accurate bits beyond $2_{m-53}$ $$b = m - 53 - \log_2(D + 2^{2p}\max|v''| + 2^{3p}\max|v'''|) \tag{20}$$

Figure 13:
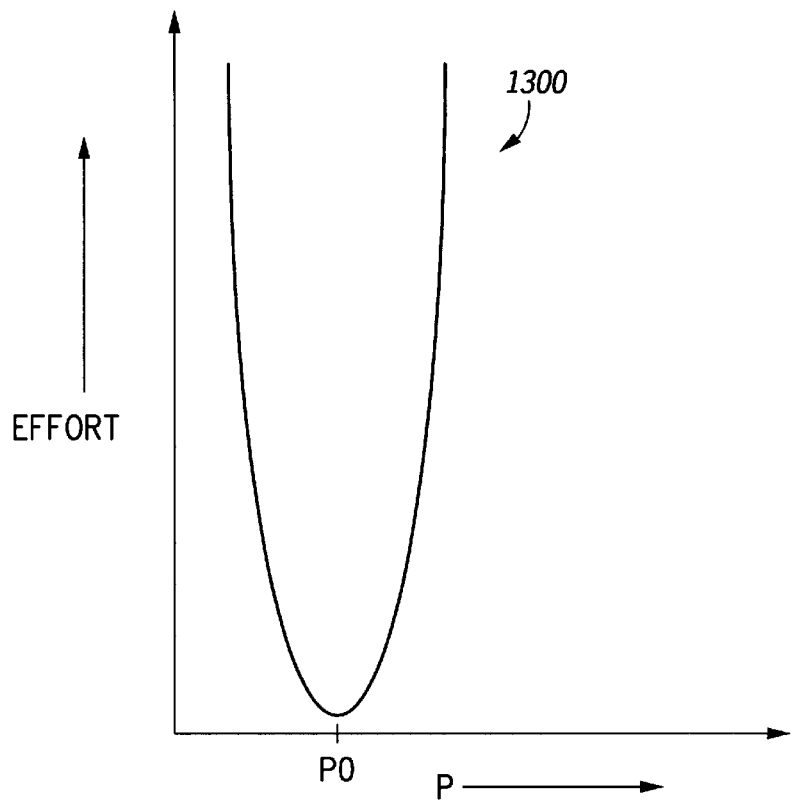
FIG. 13 illustrates, in an XY plot, the impact of the choice of small interval size on the process of FIG. 12 in accordance with the present invention.

In equation (20), the max values are taken over the entire analysis domain. It is straightforward to evaluate the cost for values of p ranging from 1 to 26 (or higher) and choose the value of p which minimizes the cost. A p value higher than 26 is high enough that the computation is already pretty cheap. Typical p values are on the order of 16, which means that $2^{17} = 131072$ values are considered at a time. This choice of p for the interval size gives the method sufficient performance to find the complete set of candidate hard-to-round values x in reasonable times. FIG. 13 shows the rough behavior of the cost per x-value in an analysis domain as a function of p. The curve 1300 shows the cost rises very rapidly for p a little higher or a little lower than the optimal value. Therefore, choosing an optimal p value, $p_0$, using equations (18)–(20) is important to reduce processing complexity and time to completion.

The value q is much less critical than the choice of p. In practice, it suffices to take a value of q given by $$q = (52-p)/2. \tag{21}$$

In an analysis domain spanning $2^{52}$ numbers, there are then $2^{52-(p+q+1)}$ large intervals, with each large interval containing $2^q$ small intervals of size $2^{p+1}$. In practice, only enough large intervals needed to span the interval size $n_2 - n_1$ are needed, and the last large interval may have fewer than $2^q$ small intervals. After obtaining p and q values in step 1202, step 1204 initiates a loop over the large intervals defined by n (as defined in eqn. (5)). In a step 1206, tables which are used for going from one small interval to another are initialized. These tables contain difference values which will be used to rapidly compute the v, v' and v" values from equations (11)–(14) which are different for each small interval defined by p. Computing these values rapidly is important because the small interval loop is executed many times during the analysis shown in FIG. 12. The use of these v, v', and v" computation details will be described later via FIG. 14. In step 1208, the loop over small intervals, defined by p, is initiated for each large interval. The first step 1210 is to find elements of the set $S_1$ (see equation (17)) belonging to that small interval, i.e., find d in the range $-2^p$ to $2^p$ such that $$\min |v + v'd - g\ 2^{m-53}| \leq D + 2^{2p}\max|v''| + 2^{3p}\max|v'''|. \tag{22}$$

Figure 14:
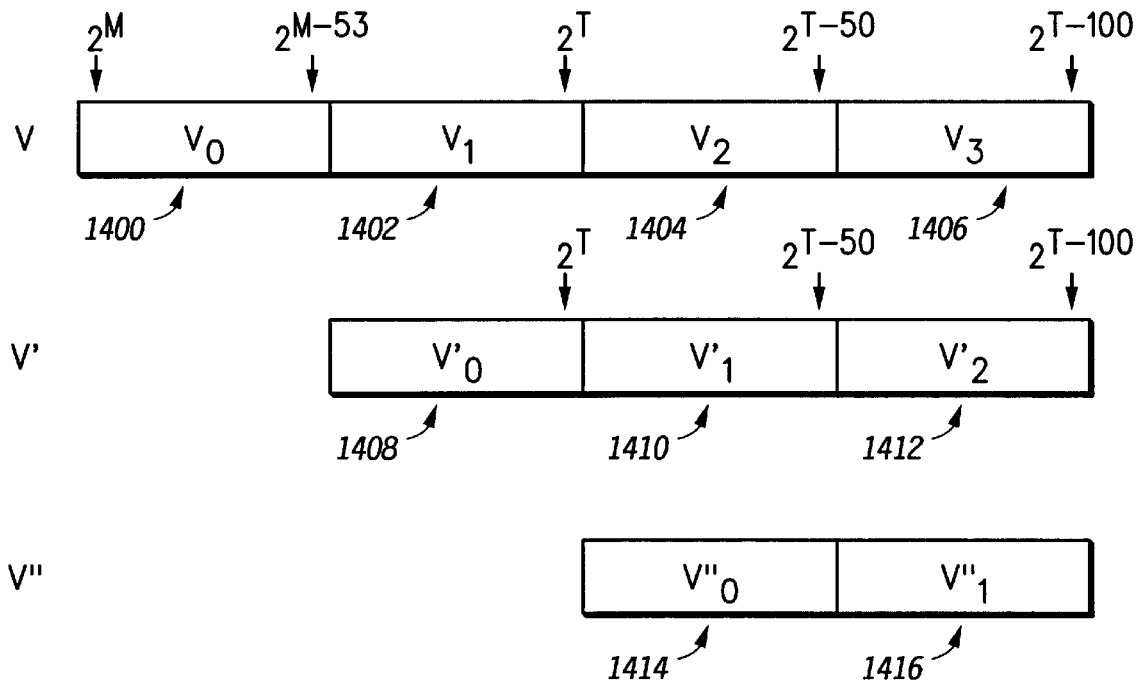
FIGS. 14 and 15 illustrate, in block diagrams, bit data fields that are used for generating values that are screened to find the hard-to-round set of x in accordance with the present invention.

The structure used to achieve the objective of step 1210 in FIG. 12 is illustrated in detail in FIG. 14. Each of the terms v, v' and v" is expressed as a series of bit sequences in FIG. 14. The most significant part of v, $v_0$ 1400 is 54 bits long, while $v_1$ 1402 is up to 50 bits long, $v_2$ 1404 is 50 bits long and $V_3$ 1406 represents all remaining bits of v. The 54 bits of $v_0$ 1400 correspond to 53 bits of a representable value and a rounding bit. The 50-bit limitation on the other values which are used in the computation makes efficient use of arithmetic operations on the PowerPC™ computers on which the method has been internally implemented using floating-point arithmetic. For hardware with higher-precision floating-point or integer arithmetic, the number of bits for representing values $v_1$–$v_3$ could be more than 50. The most significant part of v', $v_0'$ 1408 and $v_1$ 1402 are chosen to have a common bit position at $2^t$ (i.e., they are aligned). The value of t is chosen so that for the entire analysis domain the segments 1408 and 1402 are as long as possible up to a maximum of 50 bits. The next segment of v', $v_1'$ 1410 is 50 bits long, and $v_2'$ 1412 represents the remaining bits of segment v' of FIG. 14. The most significant part of v", $v_0"$ 1414 is the first 50 bits of v", while $v_1"$ 1416 represents the remaining bits of segment v" of FIG. 14.

Expressing equation (22) in units of $2^t$, the goal is to look for all d and g satisfying the following dual constraints in order to find candidate hard-to-round values x:

$$|v_1 + v_0'd - g\ 2^{m-53-t}| \leq 2^{-t}(D + 2^{2p}\max|v''| + 2^{3p}\max|v'''|) + 1 + 2^p + E_1 \tag{23}$$

$$-2^p \leq d \leq 2^p \tag{24}$$

The term $E_1$ represents a bound on any inaccuracies in computed values of v and v' from which the bit sequences $v_1$ and $v_0'$ were computed. Its evaluation is described later. Equations (23) and (24) have some interesting features. First of all, the term $v_0$, which is very nearly the function value, is not needed. Dropping it simply corresponds to taking a different g value in equation (23) as g was defined in eqn. (6). After all, the object is to find the hardness-to-round f(x), and this finding depends only on the bits to the right of the rounding bit and the rounding bit is in the least significant bit of the value $v_0$. Secondly, the terms 1 and $2^p$ come as bounds on the errors incurred by neglecting $v_2$, higher-order terms in v and $v_1'$, and higher-order terms in v'. Finally, equations (23) and (24) can be solved simultaneously not just for the value g which minimizes (23) but for all values d and g which satisfy the dual constraints (23) and (24) in time proportional to p (which is logarithmic in the size of the interval) and not brute force instead of a linear function of the size of the interval (which is the brute force method). The change of the execution cost from a conventional linear cost based on the interval size to a logarithmic cost based on p is the primary reason why the algorithm taught herein can obtain hard-to-round values x in the order of days where the prior art would take hundreds of millennia longer when using the same processing power. The method of finding these fast solutions to equations (23) and (24) will be described later with the aid of FIG. 16.

On the order of one candidate value d is found per small interval defined by p. As it is found, a quadratic filtering step 1212 quickly checks to see if $$|(v_1+v_0'd-g\ 2^{m-53-t})+v_2+dv_1'+d^2v_0''|\leq 2^{-t}(D+2^{2p-50}\max|v''|+2^{3p}\max|v'''|)+2^{-50}+2^{p-50}+E_2. \quad (25)$$

where equation (25) is derived from equation (16).

The term in parentheses on the left side of equation (25) has already been computed in the generation process since equation (23) is similar in content and form to equation (25), so that a few additions and multiplications are all that are needed to complete the filter step 1212 of FIG. 12. The right-hand side of the computation is simply a constant for the entire analysis domain and need not be repeatedly calculated by the method taught herein. $E_2$ represents a bound on any inaccuracies in computed values of v, v' and v'' from which the bit sequences $v_1$ and $v_0'$ were computed. Its evaluation is described later. Each candidate value passing the filter in step 1212 is a member of $S_2$ and is converted back to its n value using $n=n_0+d$; these members of $S_2$ are saved for a final check to see if it is actually in the hard-to-round set of x (see step 1220 in following text). Typically, only one in tens of thousands of candidates passes the quadratic filter step 1212. In step 1214, the tables of v, v' and v'' values are updated for the next small interval defined by p, and in step 1216, the loop body starting with step 1210 is repeated for the next interval or exited on completion of all small intervals within a large interval. In step 1218, if any large intervals remain, the loop body beginning with step 1206 is repeated. Otherwise, in step 1220 each member of $S_2$ can be explicitly checked one-at-a-time to see if it is truly in the hard-to-round set of x. This last step typically takes only a few minutes even using the inefficient brute force linear evaluation method. Therefore, the process of FIG. 12 finds the hard-to-round numbers x in days where the prior art brute force method would take many millennia when using the same computing power.

Figure 15:
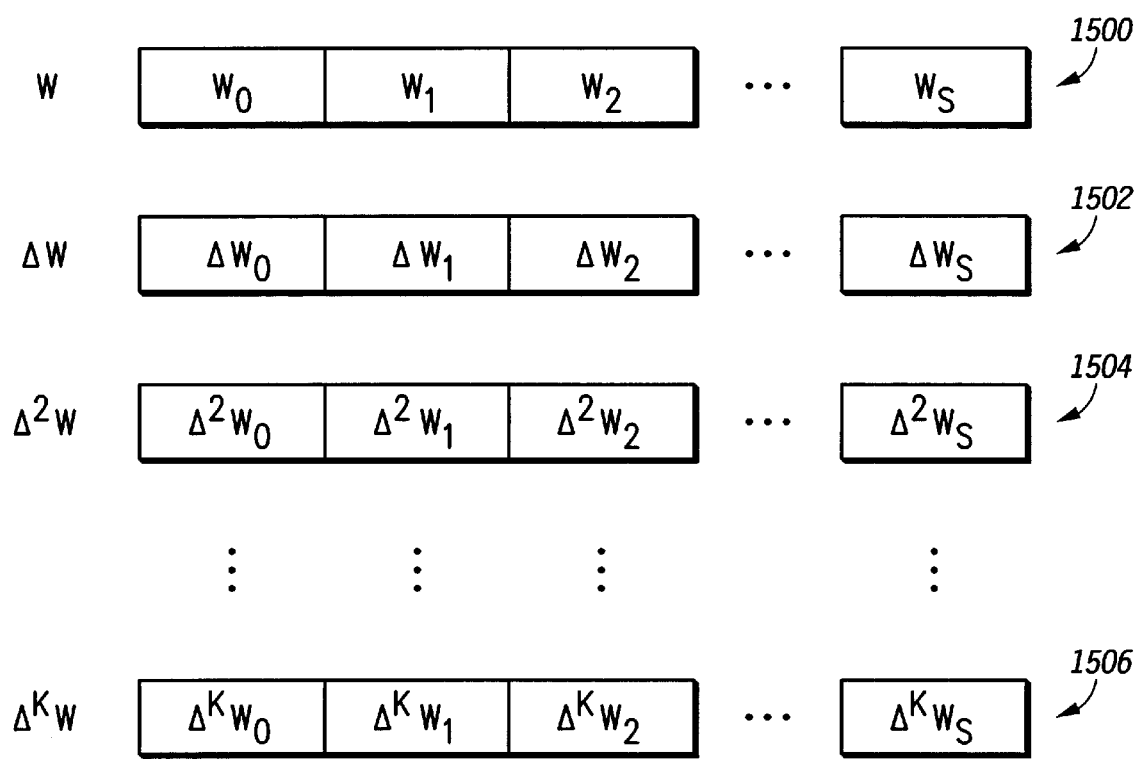

FIG. 15 illustrates a generic data structure which is used to rapidly compute values of a function w which is described by a series of bit sequences similar to those of FIG. 14. A similar structure to that shown in FIG. 15 is used for w corresponding to v, v' and v'' in FIG. 14. The general structure of FIG. 15 is used in steps 1206 and 1214 of FIG. 12. In the steps described in FIG. 12, the value $n_0$ is incremented in steps of $2^{p+1}$, and this increment is done $2^q$ times to process all the small intervals. Let the function $w(N+i2^{p+1})$ be expanded about the value N in a power series for i from 0 to $2^q$:

$$w(N+i2^{p+1}) = \sum_{k=0}^{K} w^{(k)}(N)i^k 2^{k(pn)}/k! + w^{(K+1)}(H)i^{K+1}2^{(K+1)(p+1)}/(K+1)! \quad (26)$$

The $w^{(k)}(N)$ denotes the kth derivative of the function w evaluated at the initial value N. If only the sum to K is kept in equation (26), the error introduced is just the last term $w^{(K+1)}(H)i^{K+1}2^{(k+1)(p+1)}/(K+1)!$ on the right-hand side of equation (26), where H represents some real value between 0 and $2^q$. Not knowing H doesn't matter, since it is sufficient to bound the error term by the worst value it could have over the entire interval. In addition, the largest possible value of i ($2^q$) may be assumed in evaluating the error bound. The value of K is chosen by successively evaluating error bounds for different values of K until an error is found which is small compared with a threshold value $2^{m-106}$. The maximum value of the error term is then one contribution to $E_1$ and $E_2$ as previously discussed with respect to equations (23) and (25).

Once the sum in equation (26) has been truncated at K, w is simply a polynomial in i and may be evaluated using forward difference methods. FIG. 15 illustrates K forward differences (w ... $\Delta^K$w) of the function w as number values represented by bit sequences 1500 to 1506. The values 1500–1506 are initialized by computing, via some independent method, the function values w(N), w(N+1), . . . , w(N+K). A number s of sequences of bits of w(N) is the number w 1500. The first forward differences $\Delta$w(N), . . . , $\Delta$w(N+K−1) are computed with the formula $\Delta$w(N+i)=w(N+i+1)−w(N+i). The value $\Delta$w(N) is the number $\Delta$w 1502. Similarly, the $j^{th}$ forward difference is computed from the $(j−1)^{th}$ forward difference $\Delta^j$w(N+i)=$\Delta^{j-1}$w(N+i+1)−$\Delta^{j-1}$w (N+i) for j from 2 to K and i from 0 to K−j, with finally $\Delta^K$w(N+i)=$\Delta^{K-1}$w(N+i+1)−$\Delta^{K-1}$w(N+i). FIG. 15 illustrates $\Delta^2$w 1504 and $\Delta^K$w 1506. In step 1206, these values from FIG. 15 are initialized. In step 1214, they are updated by use of the equations $$w=w+\Delta w \quad (27)$$

$$\Delta w=\Delta w+\Delta^2 w \quad (28)$$

$$\Delta^{K-1}w=\Delta^{K-1}w+\Delta^K w \quad (29)$$

and $\Delta^K$w does not change. Equations (27) to (29) describe a way of evaluating the polynomial that is obtained by dropping the error term in equation (26). Because many additions are used, sufficient bits must be kept in each of the terms w, $\Delta$w, . . . , $\Delta^{K-1}$w, and FIG. 15 illustrates a number of segments of 50-bit sequences. To determine how many bits are needed, let $2^u$ be the lowest bit position kept. That means that the error in any of the differences is less than $2^u$. An exact expression for w(N+i) is $$w(N+i) = \sum_{k=0}^{K}\binom{i}{k}\Delta^k w(N) \quad (30)$$

and an upper bound for the error term is therefore $$B = 2^u \sum_{k=0}^{K}\binom{2^q}{k}. \quad (31)$$

It suffices to choose a u such that B is smaller than a threshold value which can be taken to be $2^{m-106}$. The value $2^{m-106}$ is an arbitrary, yet reasonable, value chosen to be some value less than D, where D is $2^{m-101}$. The value B also contributes to the error terms $E_1$ and $E_2$ as previously discussed with respect to equations (23) and (25).

The computations described and their contributions to $E_1$ and $E_2$ are done separately for v, v' and v'' below. The first segment size from FIG. 14 is chosen according to $v_1$, $v_0'$ or $v_0''$ (since the value of $v_0$ doesn't affect the difficulty of rounding as previously discussed) and 50-bit segments are chosen thereafter. The addition indicated in equations 27–29 is multi-precision addition. The segments in FIG. 15 for a given function w all line up, and the addition is performed on segment j (from s decreasing to 0) by performing the addition of segments to get a sum, adding and subtracting to the sum the number $3 \times 2^{51}$ times the lowest bit value of the segment to get a carry to the next segment, subtracting the carry from the sum to generate the segment value for that sum. This is a floating-point implementation which is efficient on machines with 53-bit floating-point numbers but 32-bit integers. In typical calculations, as many as eight segments (i.e., s=8) are used. Alignment is straightforward with integer arithmetic.

The initial computation of accurate function values can be done with a standard multiprecision arithmetic package or by some other means. The advantage of using the difference method is that only a few (order of a hundred) very accurate computations need to be done in order to generate table values useful for screening billions of numbers via FIG. 12. There is of course some inaccuracy in the function values used, and this must be included in the error bounds $E_1$ and $E_2$ in equations (23) and (25). This completes the discussion of FIG. 15 and the steps 1206 and 1214 of FIG. 12. As described earlier, the efficient finding of solutions to equations (23) and (24) is key to this method.

This may be expressed more generally as finding all integer solutions (x,y) to the constraint inequalities $$|ax+by+c| \leq \delta \qquad (32)$$

$$o_1 \leq x \leq o_2 \qquad (33)$$

The constants a, b, c and $\delta$ are integers. Without loss of generality, a and b can be taken to be positive integers, since if a is negative, the problem is equivalent to solving $|(-a)x+(-b)y+(-c)| \leq \delta$ and if b is negative, each solution (x,y) to $|ax+(-b)y+c| \leq \delta$ gives a solution (x,−y) to the original equation $|ax+by+c| \leq \delta$. In addition, cases where either a or b is zero are trivial. $\delta$ must be non-negative for there to be solutions. Finding solutions by just looking at all points near the lines is not efficient, since the number of points to be scanned may be far more than the number of solutions. For example, if the two parallel lines are separated by a distance of one billionth and the range of x values is a billion, one would expect an average of about one solution, but examining each point would require a billion steps.

Figure 16:
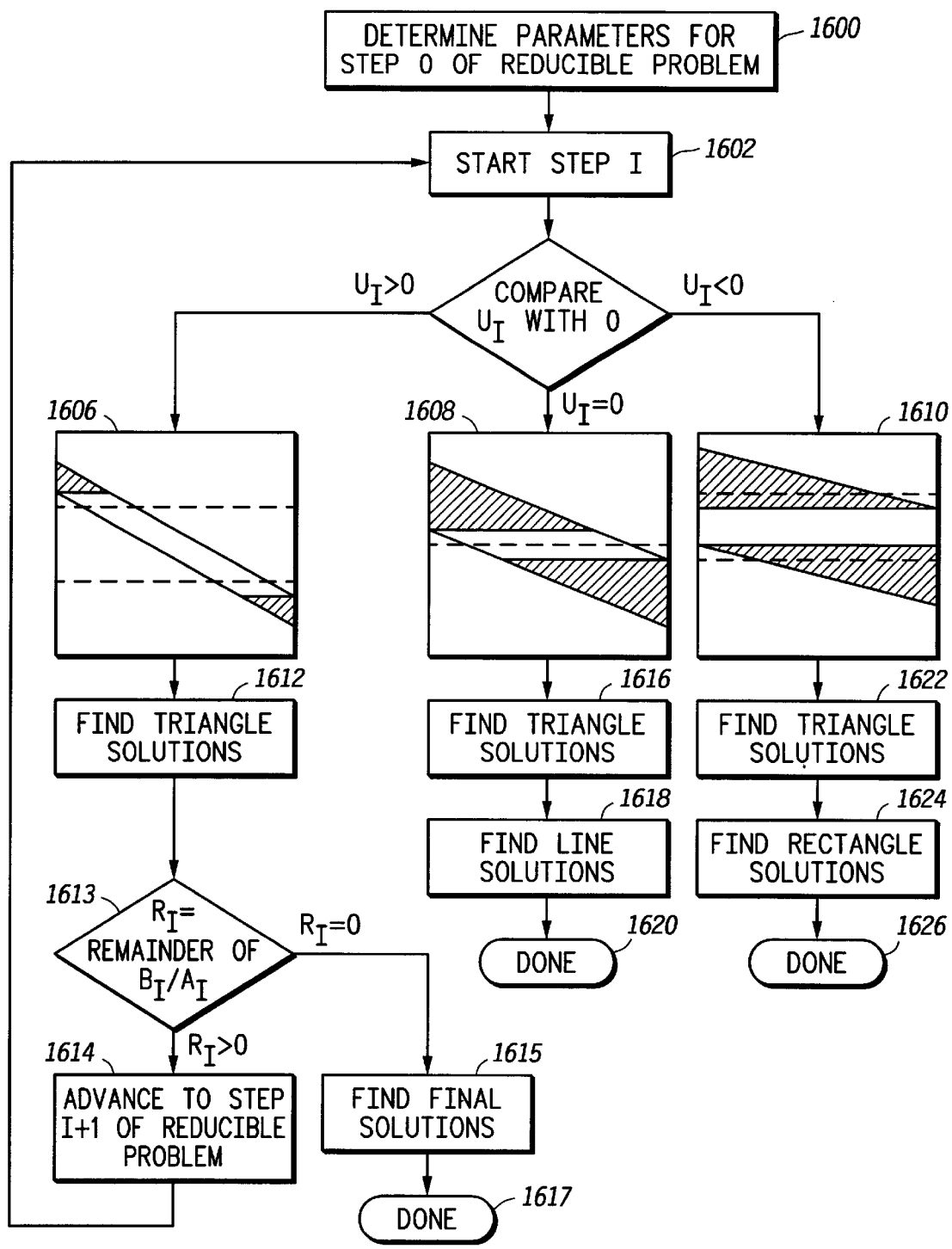
FIG. 16 illustrates, in a flowchart, a method for solving the inequality $|ax+by+c|\leq \delta$ in an efficient manner to enable the hard-to-round values of x to be found in accordance with the present invention.

FIG. 16 shows a fast and efficient method for solving the constraints.

In step 1600, the problem is mapped into a more general problem which can be solved in a series of steps. The restructured problem is characterized by a set of functionals $$L_i(x_i, y_i) = a_i x_i + b_i(y_i - u_i) - \Sigma_i - \delta \qquad (34)$$

$$= a_i(x_i - m_i) + b_i y_i + \sigma_i + \delta \qquad (35)$$

The two forms avoid the need for high-precision arithmetic in the calculations. The $\Sigma_i$ and $\sigma_i$ are non-negative and less than b. The constraints on these functionals are:

$$m_i \geq x_i \geq 0 \qquad (36)$$

$$L_i(x_i, y_i) \leq \delta \qquad (37)$$

$$L_i(x_i, y_i) \geq -\delta \qquad (38)$$

The method is an iterative one in which the case i=0 correspond to the initial problem and in which subsequent i values correspond to successively simpler problems to solve for $x_i$ and $y_i$. The relation between (x,y) solutions and $(x_i, y_i)$ solutions by:

$$x = X_u^i + p_i x_i + q_i(y_i - u_i) = X_m^i + p_i(x_i - m_i) + q_i y_i \qquad (39)$$

$$y = Y_u^i + p_i' x_i + q_i'(y_i - u_i) = Y_m^i + p_i'(x_i - m_i) + q_i' y_i \qquad (40)$$

The parameters for the i=0 case are determined from the original a, b, c and $\delta$ by $$a_0 = a \qquad (41)$$

$$b_0 = b \qquad (42)$$

$$X_u^0 = x_1 \qquad (43)$$

$$X_m^0 = x_2 \qquad (44)$$

$$Y_u^0 = -\text{ceil}((ao_1+c+\text{delta})/b) \qquad (45)$$

$$Y_m^0 = -\text{floor}((ao_2+c-\text{delta})/b) \qquad (46)$$

$$m_0 = o_2 - o_1 \qquad (47)$$

$$u_0 = Y_u^0 - Y_m^0 \qquad (48)$$

$$\Sigma_0 = -b\, Y_u^0 - (ao_1+c+\text{delta}) \qquad (49)$$

$$\sigma_0 = b\, Y_m^0 + (ao_2+c-\text{delta}) \qquad (50)$$

$$p_0 = 1 \qquad (51)$$

$$q_0 = 0 \qquad (52)$$

$$p_0' = 0 \qquad (53)$$

$$q_0' = 1 \qquad (54)$$

In step 1602, the loop is started for the case i. Step 1604 compares the value $u_i$ (also referred to as the upper y' value) with 0 (referred to as the lower y' value). If $u_i$ is positive, the constraints have the structure shown in box 1606. The two diagonal lines represent the constraints of equations (37) and (38), while the vertical edges of the box represents the constraints of equation (36). Step 1612 finds any solutions in the two cross hatched triangular regions shown in box 1606. If there are solutions (x,y) in the upper triangle, they correspond to non-negative values of $\lambda$ and $\mu$ for which $$ax+by+c = a_i \lambda + b_i \mu + (b_i - \Sigma_i - \delta) \leq \delta, \qquad (55)$$

their values are $$x = X_u^i + p_i \lambda + q_i(1+\mu) \qquad (56)$$

$$y = Y_u^i + p_i'' \lambda + q_i'(1+\mu). \qquad (57)$$

A doubly-nested loop over of $\lambda$ and $\mu$, with each loop terminating when the constraint of equation (55) is violated, generates all these solutions and the value of ax+by+c. If there are solutions (x,y) in the lower triangle, they correspond to non-negative values of $\lambda$ and $\mu$ for which $$ax+by+c = -a_i \lambda - b_i \mu - (b_i - \sigma_i - \delta) \geq -\delta, \qquad (58)$$

their values are $$x = X_m^i - p_i \lambda - q_i(1+\mu)\text{tm} \qquad (59)$$

$$y = Y_m^i - p_i' \lambda - q_i'(1+\mu). \qquad (60)$$

Step 1613 lets $k_i$ be the integer quotient and $r_i$ the integer remainder obtained by dividing $a_i$ into $b_i$. If $r_i$ is zero, then in step 1615 all remaining solutions (x,y) corresponding to values $$ax+by+c = a_i \lambda + a_i\, \text{ceil}(\Sigma_i / a_i) - \Sigma_i - \delta \leq \delta \qquad (61)$$

are found for $0 \leq \mu \leq u_i$ and all non-negative values of $\lambda$ for which equation (61) is satisfied. This is simply solved with two loops, one over $\mu$ and one over $\lambda$. The loop over $\lambda$ stops whenever the value of ax+by+c computed by equation (61) exceeds $\delta$. The task then is completed in step 1617.

Otherwise, step 1614 makes the preparations necessary to advance to step i+1. The new step has parameters $$\Sigma_{i+1}=a_i \text{ ceil}((\sigma_i+2\delta)/a_i)-\sigma_i-2\delta \tag{62}$$

$$\sigma_{i+1}=a_i \text{ ceil}((\Sigma_i+2\delta)/a_i)-\Sigma_i-2\delta \tag{63}$$

$$m_{i+1}=u_i \tag{64}$$

$$u_{i+1}=m_i-k_i-\text{ceil}((\Sigma_i+2\delta)/a_i)-\text{ceil}((\sigma_i+2\delta)/a_i) \tag{65}$$

$$a_{i+1}=r_i \tag{66}$$

$$b_{i+1}=a_i \tag{67}$$

$$X_m^{i+1}=X_u^i+\text{ceil}((\Sigma_i+2\delta)/a_i)p_i \tag{68}$$

$$X_u^{i+1}=X_m^i-\text{ceil}((\sigma_i+2\delta)/a_i)p_i \tag{69}$$

$$Y_m^{i+1}=Y_u^i+\text{ceil}((\Sigma_i+2\delta)/a_i)p_i' \tag{70}$$

$$Y_u^{i+1}=Y_m^i-\text{ceil}((\sigma_i+2\delta)/a_i)p_i' \tag{71}$$

$$p_{i+1}=q_i-k_i p_i \tag{72}$$

$$q_{i+1}=p_i \tag{73}$$

$$p_{i+1}'=q_i'-k_i p_i' \tag{74}$$

$$q_{i+1}'=p_i' \tag{75}$$

Then control continues with step i+1 in step 1602. The important feature of this step is that the size of the parameters $a_i$ and $b_i$ and the width $u_i$ decrease exponentially with each step and that therefore the number of steps taken is logarithmic in the size of the original interval.

If $u_i$ is 0 in step 1604, the constraints have the structure shown in box 1608. The two diagonal lines represent the constraints of equations (37) and (38), while the vertical edges of the box represents the constraints of equation (36). Step 1616 finds any solutions in the two cross-hatched triangular regions shown in box 1608. Any solutions (x,y) in the upper triangle are found according to equations (55)–(57). Any solutions in the lower triangle are found according to equations (58)–(60). Step 1618 finds solutions (x,y) along the dashed line shown in box 1608 for non-negative $\lambda$ for which $$ax+by+c=a_i\lambda-a_i \text{ floor}((\sigma_i+2\delta)/a_i)+\sigma_i+\delta\leq\delta \tag{76}$$

with $$x=X_m^i-p_i \text{ floor}((\sigma_i+2\delta)/a_i)+p_i\lambda \tag{77}$$

$$y=Y_m^i-p_i' \text{ floor}((\sigma_i+2\delta)/a_i)+p_i'\lambda \tag{78}$$

A simple loop over $\lambda$ generates these results. Then in step 1620 all solutions have been found.

Finally, if in step 1604 $u_i<0$, the case is illustrated in box 1610. Step 1622 finds any solutions in the two cross-hatched triangles. If there are solutions (x,y) in the upper triangle, they correspond to non-negative values of $\lambda$ and $\mu$ for which $$ax+by+c=a_i\lambda+b_i\mu-(b_iu_i+\Sigma_i+\delta)\leq\delta, \tag{79}$$

their values are $$x=X_u^i+p_i\lambda+q_i(\mu-u_i) \tag{80}$$

$$y=Y_u^i+p_i'\lambda+q_i'(\mu-u_i) \tag{81}$$

The loops to achieve this are similar to those described previously. If there are solutions (x,y) in the lower triangle, they correspond to non-negative values of $\lambda$ and $\mu$ for which $$ax+by+c=-a_i\lambda-b_i\mu+(b_iu_i+\sigma_i+\delta)\geq-\delta \tag{82}$$

their values are $$x=X_m^i p_i\lambda-q_i(\mu-u_i) \tag{83}$$

$$y=Y_m^i-p_i'\lambda-q_i'(\mu-u_i) \tag{84}$$

The loops to achieve this are similar to those described previously. Then in step 1624, solutions are found for the white rectangle between the two triangles in 1610. If $u_i$ is −1, there are no solutions. Otherwise there are solutions for $(0\leq\lambda\leq m_i)$ and $(0\leq\mu\leq-(2+u_i))$ satisfying $$ax+by+c=a_i\lambda+b_i(1+\mu)-\Sigma_i-\delta) \tag{85}$$

$$x=X_u^i+p_i\lambda+q_i(\mu+1) \tag{86}$$

$$y=Y_u^i+p_i'\lambda+q_i'(\mu+1) \tag{87}$$

Two loops easily achieve this objective. Then in step 1626, the generation is complete.

The above FIGS. 3–16 illustrate how an integrated circuit (IC) designer, supercomputer designer, or software engineer would generate all the hard-to-round values of x for any function f(x) (e.g., $\log_b(x)$, $b^x$, arctan(x), etc., where b is a base for which common values are 2, e and 10). These values only need to be generated once. After such generation, they may be repeatedly used by the engineers to "test" and "refine" their approximation algorithms to optimal error tolerances. The optimal error tolerance is the largest error tolerance that can be used while still ensuring that all of the hard-to-round values are properly rounded for each and every applicable rounding mode and value of x that is applicable. By using the largest error tolerance, computational overhead is optimally minimized, while f(x) numbers are always guaranteed to be rounded properly for all applicable operands x unlike the prior art.

Figure 17:
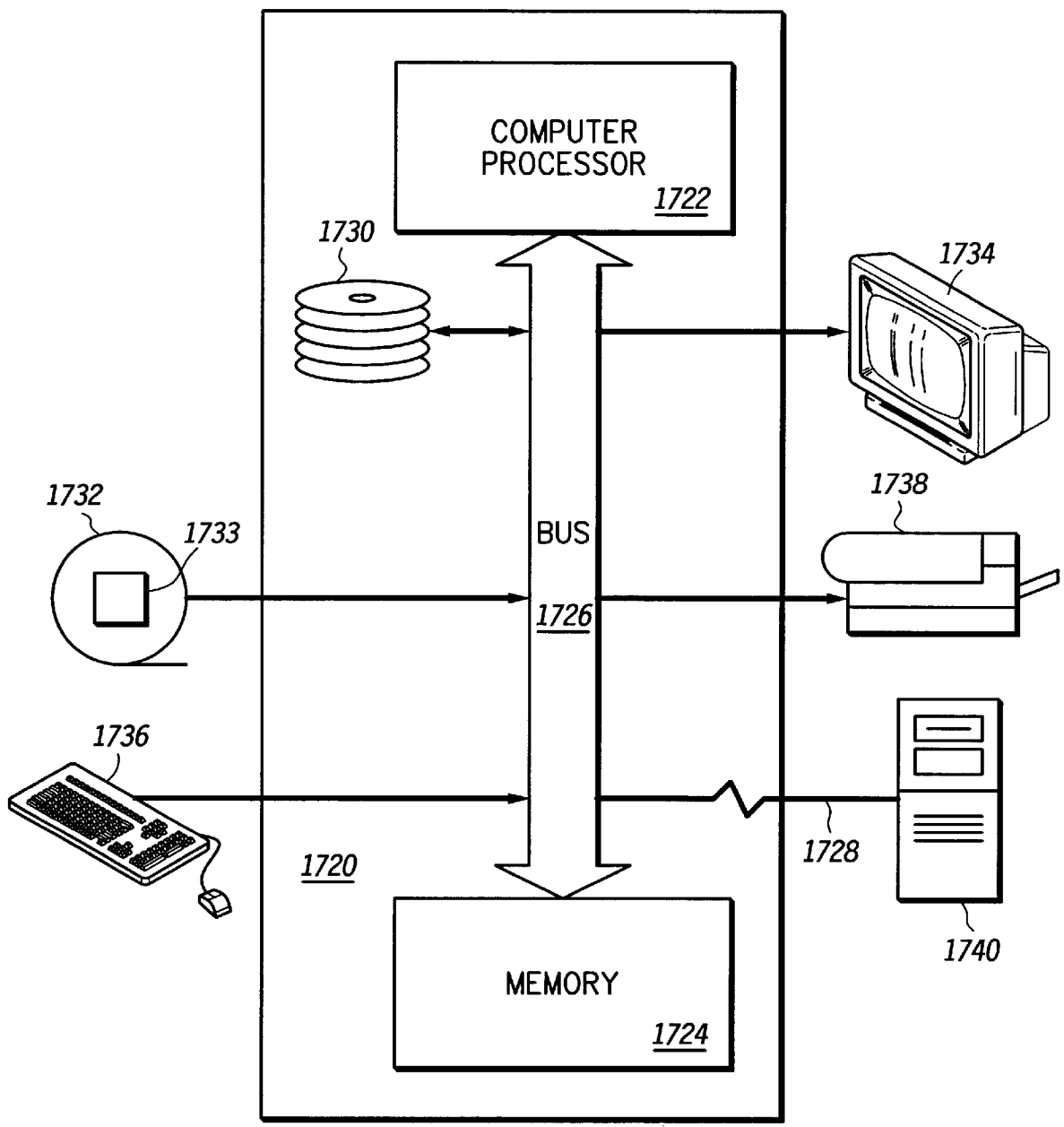
FIG. 17 illustrates, in a block diagram, a General Purpose Computer capable of executing the methods in accordance with the present invention.

FIG. 17 is a block diagram illustrating a General Purpose Computer 1720 capable of executing methods described herein. The General Purpose Computer 1720 has a Computer Processor 1722, and Memory 1724, connected by a Bus 1726. Memory 1724 is a relatively high speed machine readable medium and includes Volatile Memories such as DRAM, and SRAM, and Non-Volatile Memories such as ROM, FLASH, EPROM, EEPROM, and bubble memory. Also connected to the Bus are Secondary Storage 1730, External Storage 1732, output devices such as a monitor 1734, input devices such as a keyboard (with mouse) 1736, and printers 1738. Secondary Storage 1730 includes machine readable media such as hard disk drives, magnetic drum, and bubble memory. External Storage 1732 includes machine readable media such as floppy disks, removable hard drives, magnetic tape, CD-ROM, and even other computers, possibly connected via a communications line. The distinction drawn here between Secondary Storage 1730 and External Storage 1732 is primarily for convenience in describing the invention. As such, it should be appreciated that there is substantial functional overlap between these elements. Computer software such as could be developed to implement portions of the disclosure herein, and user programs can be stored in a Computer Software Storage Medium, such as memory 1724, Secondary Storage 1730, and External Storage 1732. Executable versions of computer software 1733, can be read from a Non-Volatile Storage Medium such as External Storage 1732, Secondary Storage 1730, and Non-Volatile Memory and loaded for execution directly into Volatile Memory, executed directly out of Non-Volatile Memory, or stored on the Secondary Storage 1730 prior to loading into Volatile Memory for execution.

Generally, the process taught herein is not needed for single precision numbers. Single precision numbers that use 24 mantissa bits or fewer can be optimized using a simpler brute force method. However, any number that is represented by roughly 48 bits or more (where the sign bit, exponent bits, plus the mantissa bits equals 48 or more), this method is essential in order to find the hardest-to-round x values and optimized the evaluators with complete confidence of correct rounding.

Although the invention has been described and illustrated with reference to specific embodiments, it is not intended that the invention be limited to those illustrative embodiments. Those skilled in the art will recognize that modifications and variations may be made without departing from the spirit and scope of the invention. Therefore, it is intended that this invention encompass all of the variations and modifications as fall within the scope of the appended claims. Furthermore, claim elements and steps herein have been numbered and/or lettered solely as an aid in readability and understanding. As such, the numbering and/or lettering in itself is not intended to and should not be taken to indicate the ordering of the elements and/or steps in the claims.

What is claimed is:

1. A method of creating a numerical evaluator, the method comprising:
    (a) providing a plurality of operands x which produce results f(x) for a given function f(x) when using a rounding mode, the plurality of operands x and the results f(x) each being represented by a binary format having 48 or more total bits;
    (b) designing the numerical evaluator to approximate f(x) given at least one x value, the numerical evaluator having an error tolerance;
    (c) processing a set of the operands x using the numerical evaluator to obtain test results f(x);
    (d) checking the test results f(x) to determine if all the test results f(x) from the set of operands x were all properly rounded according to a predetermined standard result of the rounding mode in step (c); and
    (e) changing the numerical evaluator to have a different error tolerance and repeating steps (c) through (e) until no rounding errors are detected in step (d) whereby an optimal numerical evaluator is found.

2. The method of claim 1 wherein the optimal numerical evaluation is embodied in electronic circuitry on an integrated circuit.

3. The method of claim 1 wherein the optimal numerical evaluator is embodied in software for execution by a central processing unit (CPU).

4. A data structure having operands x that produce f(x) values for a given function f(x) where f(x) and x are represented by a binary format having N or more bits, where N is greater than or equal to 48, the data structure comprising:
    a first operand x, embodied on computer readable medium, where the first operand x contains N bits and, when processed using a function f(x), creates a result f(x) that is difficult to round to a correct result when using N bits and a predetermined rounding mode; and
    a plurality of additional operands x, embodied on the computer readable medium, the plurality of additional operands x contains N bits and, when processed using a function f(x), creates a result f(x) that is hard-to-round to a correct result when using N bits and a predetermined rounding mode;
    the result f(x) is hard-to-round when a predetermined error range for the result f(x) includes the exact value of operand x and the exact value is an unrepresentable number using N bits.

5. A method of calculating a transcendental function f comprising:
    receiving a plurality of operands x each having a hard to round resultant f(x), wherein the hard to round resultant f(x) is represented by N bits, and wherein the resultant f(x) is hard to round when a predetermined error range for the resultants f(x) includes the exact value of operand x and the exact value is an unrepresentable number using N bits;
    storing hard to round resultants for the plurality of operands x in a memory; and
    providing the hard to round resultants f(x) with proper rounding with respect to the theoretical exact value of f(x) according to a predetermined result for a selected rounding mode.

6. The method of claim 5, wherein the step of providing includes providing the hard to round resultant f(x) by using a lookup table.

7. The method of claim 5, wherein the step of providing includes providing the hard to round resultant f(x) by using a polynomial.

8. The method of claim 5, wherein the step of providing includes providing the hard to round resultant f(x) by using a CORDIC method.

9. The method of claim 5 wherein the hard to round resultant f(x) is represented by at least 60 bits.

10. An at least double precision function evaluator for a function f(x) represented in a binary format having N bits, the function f(x) comprising a plurality of evaluation domains that use different computational techniques as a function of the provided operand x wherein each of the different computational techniques are optimized in precision using a list of hard-to-round values read from memory, where a function is hard-to-round when a predetermined error range for the resultant f(x) includes the exact value of operand x and the exact value is an unrepresentable number using N bits.

* * * * *